(12) United States Patent
Matsumura

(10) Patent No.: US 10,628,042 B2
(45) Date of Patent: Apr. 21, 2020

(54) CONTROL DEVICE FOR CONNECTING A HOST TO A STORAGE DEVICE

(71) Applicants: BIOS CORPORATION, Tokyo (JP); MELCO HOLDINGS INC., Nagoya-shi (JP)

(72) Inventor: Seimei Matsumura, Tokyo (JP)

(73) Assignees: BIOS CORPORATION, Tokyo (JP); MELCO HOLDINGS INC., Nagoya-shi (JP)

(*) Notice: Subject to any disclaimer, the term of this patent is extended or adjusted under 35 U.S.C. 154(b) by 479 days.

(21) Appl. No.: 15/414,440

(22) Filed: Jan. 24, 2017

(65) Prior Publication Data

US 2017/0212685 A1 Jul. 27, 2017

(30) Foreign Application Priority Data

Jan. 27, 2016 (JP) .................................. 2016-013402

(51) Int. Cl.
*G06F 3/06* (2006.01)

(52) U.S. Cl.
CPC .......... *G06F 3/0605* (2013.01); *G06F 3/0629* (2013.01); *G06F 3/0658* (2013.01); *G06F 3/0661* (2013.01); *G06F 3/0665* (2013.01); *G06F 3/0689* (2013.01)

(58) Field of Classification Search
CPC ..... G06F 3/0689; G06F 11/1076–7096; G06F 12/00–16; G06F 2211/1002–1095
See application file for complete search history.

(56) References Cited

U.S. PATENT DOCUMENTS

| 9,122,589 B1* | 9/2015 | Bono ................... G06F 12/0246 |
| 2003/0118053 A1 | 6/2003 | Edsall et al. |
| 2003/0131182 A1 | 7/2003 | Kumar et al. |
| 2003/0172149 A1 | 9/2003 | Edsall et al. |
| 2005/0025075 A1 | 2/2005 | Dutt et al. |
| 2005/0036499 A1 | 2/2005 | Dutt et al. |
| 2006/0095709 A1* | 5/2006 | Achiwa ................. G06F 3/0623 711/173 |

(Continued)

FOREIGN PATENT DOCUMENTS

| JP | 2004-348195 A | 12/2004 |
| JP | 2006-505831 A | 2/2006 |
| WO | WO 2015/12199 A1 | 2/2015 |

OTHER PUBLICATIONS

Marvell Semiconductor, Inc., 88SE9220/9230/9235 PCIe to SAYA 6Gb/s Controllers Product Brief, Dec. 2011, 2 pages (Continued)

*Primary Examiner* — Nicholas J Simonetti
(74) *Attorney, Agent, or Firm* — Oblon, McClelland, Maier & Neustadt, L.L.P.

(57) ABSTRACT

A control device to be connected to a host and a disk device including at least one Redundant Arrays of Independent Disks (RAID) set, the control device includes circuitry that performs data communication with the host by a protocol capable of connecting one logical device in the RAID set to each port, virtually sets a plurality of ports which are defined by the protocol, sets a plurality of logical devices in the RAID set included in the disk device, and connects the plurality of logical devices to the plurality of ports, respectively, and the circuitry is to be connected to the host through an interface.

20 Claims, 4 Drawing Sheets

(56) References Cited

U.S. PATENT DOCUMENTS

| | | | |
|---|---|---|---|
| 2007/0094464 A1 | 4/2007 | Sharma et al. | |
| 2007/0094465 A1 | 4/2007 | Sharma et al. | |
| 2007/0094466 A1 | 4/2007 | Sharma et al. | |
| 2008/0034380 A1 | 2/2008 | Ho | |
| 2008/0065875 A1* | 3/2008 | Thompson | G06F 3/0607 713/2 |
| 2008/0320134 A1 | 12/2008 | Edsall et al. | |
| 2009/0141657 A1 | 6/2009 | Dutt et al. | |
| 2009/0228651 A1 | 9/2009 | Sharma et al. | |
| 2009/0259816 A1 | 10/2009 | Sharma et al. | |
| 2009/0259817 A1 | 10/2009 | Sharma et al. | |
| 2010/0088469 A1* | 4/2010 | Motonaga | G06F 3/0634 711/113 |
| 2011/0090816 A1 | 4/2011 | Dutt et al. | |
| 2012/0137065 A1* | 5/2012 | Odenwald | G06F 3/0605 711/114 |
| 2012/0311231 A1* | 12/2012 | Porterfield | G11C 16/06 711/103 |
| 2013/0111187 A1* | 5/2013 | Liu | G06F 3/0614 711/216 |
| 2013/0297869 A1* | 11/2013 | Mills | G06F 3/0674 711/112 |
| 2014/0201481 A1* | 7/2014 | Marulkar | G06F 21/80 711/162 |
| 2015/0262632 A1* | 9/2015 | Shelton | G06F 12/0684 711/103 |
| 2017/0109045 A1* | 4/2017 | Crawford | G06F 3/0604 |
| 2018/0203612 A1* | 7/2018 | Kats | G06F 3/0608 |

OTHER PUBLICATIONS

Office Action dated Jul. 30, 2019 in Japanese Patent Application No. 2016-013402, 9 pages (with English translation).

Office Action dated Feb. 18, 2020 in Japanese Patent Application No. 2016-013402 with Machine English Translation.

* cited by examiner

23: STORAGE DISK DEVICE CONFIGURED AS RAID ARRAY

CONTROL DEVICE FOR CONNECTING A HOST TO A STORAGE DEVICE

CROSS-REFERENCE TO RELATED APPLICATION

This application claims priority from Japanese Patent Application No. 2016-013402, filed on Jan. 27, 2016, the entire subject matter of which is incorporated herein by reference.

FIELD

This disclosure relates to a control device which is connected to a Redundant Arrays of Independent Disks (RAID) set.

BACKGROUND

Nowadays, many operating systems are compatible with an advanced host controller interface (AHCI). The AHCI is an interface specification for a Serial Advanced Technology Attachment (SATA) host bus adapter which Intel Corporation played a central role in defining, and many devices can connect one logical device to each SATA host.

There has been a demand for connecting a plurality of drives to one host bus adapter. A port multiplier which is a standard for satisfying such demand is used to connect a plurality of devices to one host. The host selects an operation object device and issues commands for the selected device. A chip set compatible with such a port multiplier is disclosed in "Marvell 88SE92xx-Product-Brief" (data sheets of Marvell 88SE9220/9230/9235 of Marvell Semi conductor Inc).

In a method using a port multiplier, a host can use a plurality of hard disk drives or the like which can be connected to one host, as one RAID set. However, the host cannot divide the RAID set into a plurality of logical devices (which are identified by different logical unit numbers (LUNs), respectively), and cannot recognize them as independent disks. Consequently, in the above-described related-art case where a host can identify only devices having capacities of 2 TiB or less, even if it is intended to use a RAID set having a capacity exceeding 2 TiB, the host cannot divide the RAID set into logical devices each having a capacity of 2 TiB or less, and cannot recognize the RAID set as devices having capacities of 2 TiB or less. Also, in the related-art case, since the host cannot divide the RAID set into a plurality of logical devices, the host cannot separately manage a system area for an operating system (OS) and a user area by dividing those areas into different logical devices. Also, in the related-art method using a port multiplier, the host divides the RAID set into a plurality of logical devices, and recognizes each logical device as an independent disk. However, the method cannot achieve benefit of the actual configuration of RAID set in improvement of reliability. In other words, the host cannot flexibly set a device configuration.

SUMMARY

According to an embodiment of the disclosure, there is provided a control device configured to be connected to a host and a disk device including at least one Redundant Arrays of Independent Disks (RAID) set, the control device comprising: circuitry configured to perform data communication with the host by a protocol capable of connecting one logical device in the RAID set to each port; virtually set a plurality of ports which are defined by the protocol; set a plurality of logical devices in the RAID set included in the disk device; and connect the plurality of logical devices to the plurality of ports, respectively, wherein the circuitry is configured to be connected to the host through an interface.

DETAILED DESCRIPTION

The disclosure has been made in view of the above-described circumstances, and an object of the disclosure is to provide a management system in which a host can flexibly set a device configuration.

Figure 1:
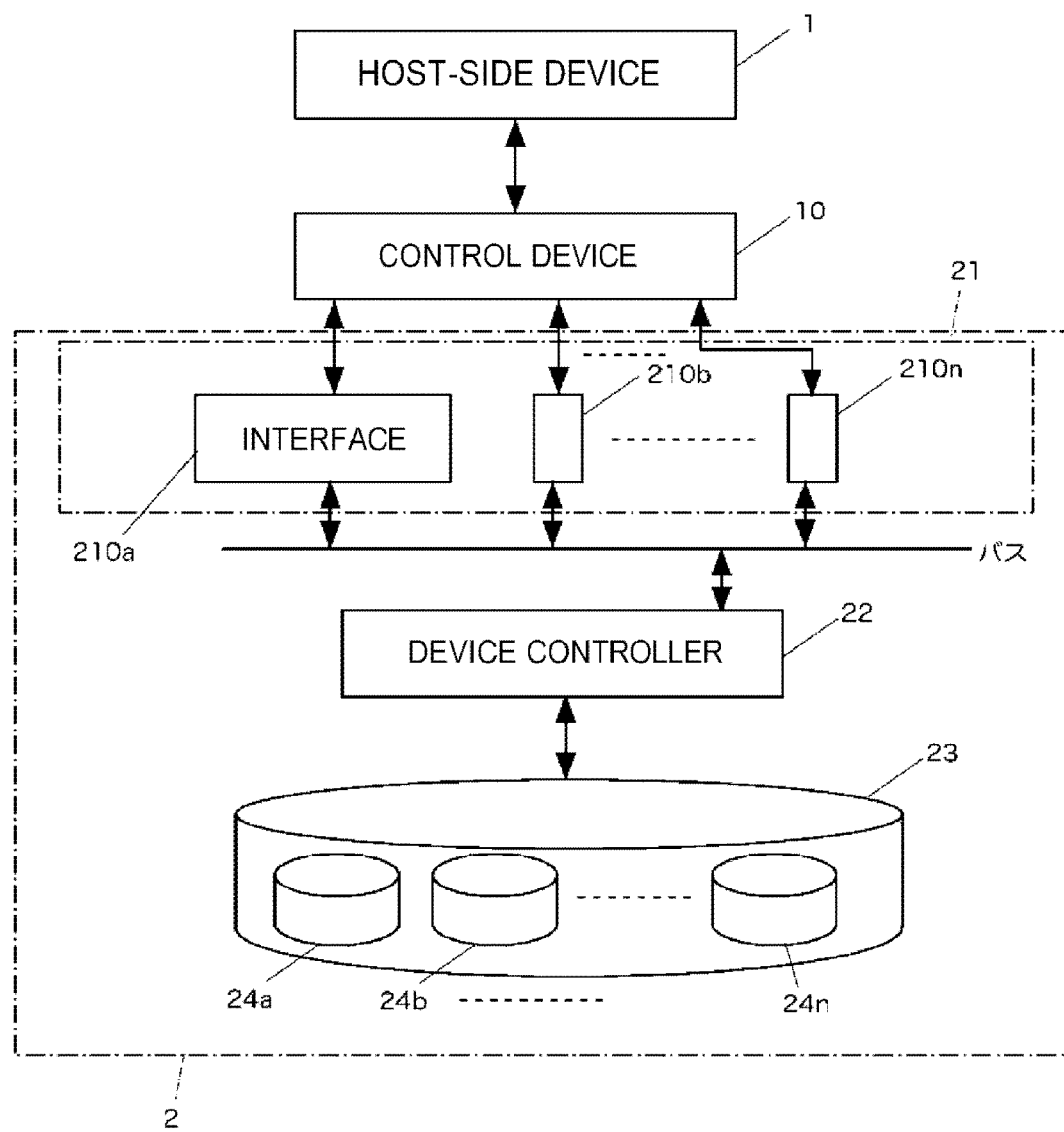
FIG. 1 is a block diagram illustrating a configuration example of a storage system including a control device according to an embodiment of the disclosure.

Embodiments of the disclosure will be described with reference to the accompanying drawings. As shown in FIG. 1, a control device 10 according to an embodiment of the disclosure is connected to a host-side device 1, such as a personal computer (PC), and a storage device 2.

The storage device 2 includes an interface unit 21, a device controller 22, and a plurality of storage disk devices 23-1, 23-2, . . . (hereinafter, referred to simply as the storage disk devices 23 when it is unnecessary to discriminate them). Here, the storage disk devices 23 are hard disk drives (HDDs) or the like.

Figure 2:
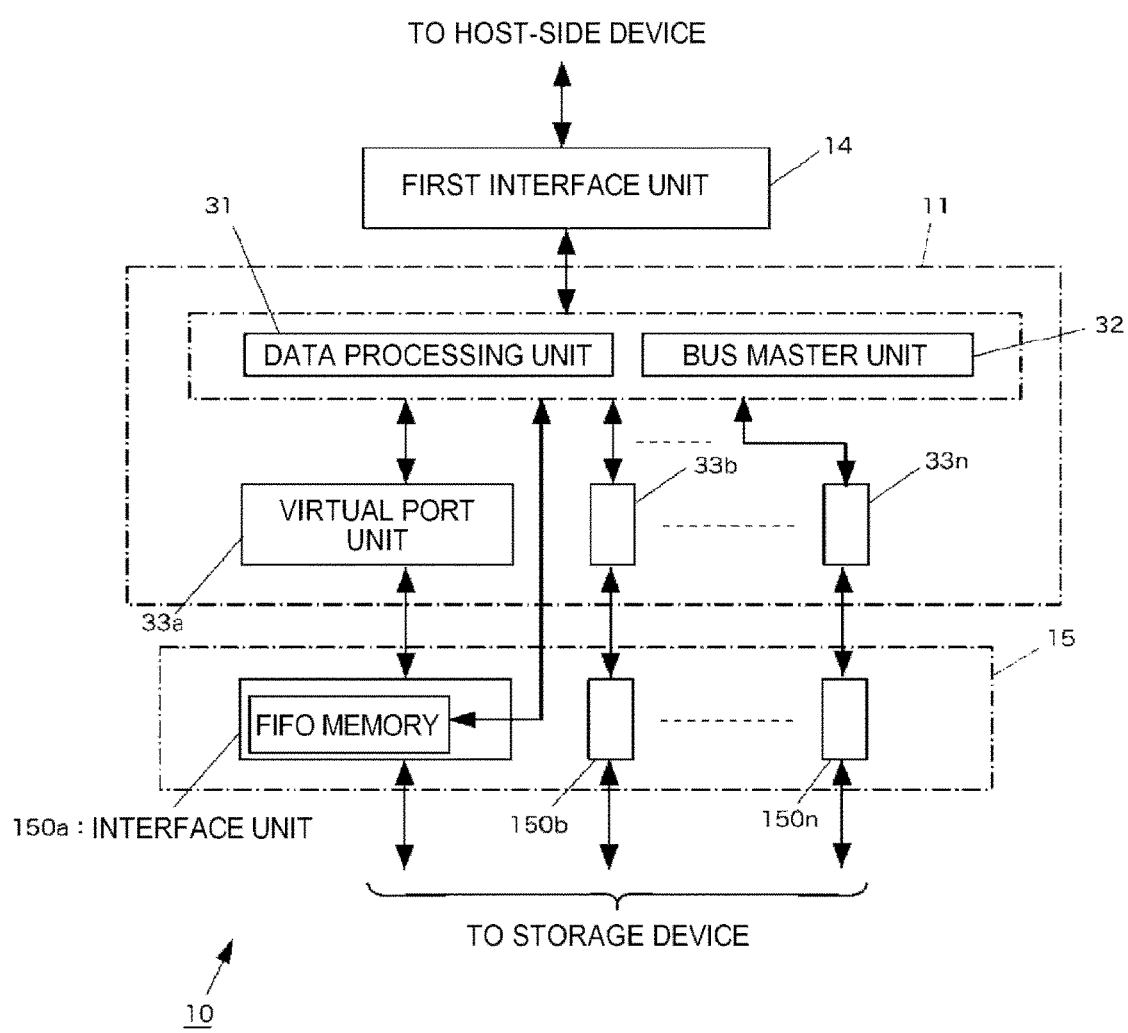
FIG. 2 is a block diagram illustrating a configuration example of a controller of the control device according to the embodiment of the disclosure.

As shown in FIG. 2, the control device 10 includes an Advanced Host Controller Interface (AHCI) controller 11, a first interface unit 14, and a second interface unit 15. The AHCI controller 11 is implemented by a programmable device such as a field programmable gate array (FPGA). The AHCI controller 11 functionally includes a data processing unit 31, a bus master unit 32, and a plurality of virtual port units 33a, 33b, . . . . The operations of the individual units of the control device 10 will be described below. Incidentally, the AHCI controller 11 may be implemented by executing a program stored in a memory by a CPU.

The interface unit 21 of the storage device 2 includes a plurality of interfaces 210a, 210b, (hereinafter, referred to simply as the interfaces 210 when it is unnecessary to discriminate them). These interfaces 210a, 210b, . . . are connected to the second interface unit 15 of the control device 10.

Each interface 210 of the interface unit 21 receives commands from the control device 10. Also, when receiving an instruction to write data in the storage disk devices 23 (a data write instruction, that is, a write command), the interface 210 acquires the data to be written (the write object data) from the control device 10, and outputs the write object data to the device controller 22.

When receiving an instruction to read data (a data read instruction, that is, a read command), each interface 210 receives the data to be outputted, from the device controller 22, and outputs the received data to the control device 10.

The device controller 22 includes a cache memory. When the device controller 22 receives a write command and write object data to be written in the storage disk devices 23, through the interface unit 21, the device controller 22 records them in the cache memory. Further, the device controller 22 records the write object data in the storage disk devices 23. Also, when the device controller 22 receives a read command through the interface unit 21, the device controller 22 reads read object data from the storage disk devices 23, and outputs the read data to the interface unit 21.

In an example of the present embodiment, the device controller 22 functions as a Redundant Arrays of Independent Disks (RAID) controller. In this example, the storage disk devices 23 which are configured by a plurality of HDDs operate as a RAID array. FIG. 1 shows that the HDDs included in the storage disk devices 23 configure a RAID array such that the HDDs can be recognized as a single disk by the host. In the following description of the present embodiment, the device controller 22 functions as a RAID controller. But the present embodiment is not limited to the case where the storage disk devices 23 are configured as a RAID array.

In the present embodiment, the device controller 22 is connected to the interface unit 21, for example, through a bus. When a setting value for setting logical devices is inputted from the host-side device 1 to the device controller 22 through the control device 10, the device controller 22 sets a plurality of logical devices 24a, 24b, . . . (hereinafter, referred to simply as the logical devices 24 when it is unnecessary to discriminate them) in the RAID array based on the input setting value. Then, the device controller 22 logically connects the individual logical devices 24a, 24b, . . . set in the RAID array, to the interfaces 210a, 210b, . . . respectively. Here, the setting value for setting logical devices includes, for example, a value representing the number of logical devices 24.

Similarly to setting of the logical devices 24, it is possible to perform setting on the entire system from the host-side device 1 as in the following example. When a register value for setting logical devices stored in the AHCI controller 11 is rewritten according to an instruction from the host-side device 1, the AHCI controller 11 sends the setting value for setting logical devices through an arbitrary virtual port (for example, the 0-th virtual port) of the control device 10. Since the instruction inputted to the storage device 2 is for setting logical devices in the entire system, the RAID array is divided into logical devices according to the instruction.

This setting may be performed based on an instruction from a management communication port (such as an Ethernet (registered trademark) port, not shown), an operation panel (not shown), or the like included in the storage device 2.

Accordingly, each logical device 24 becomes accessible (in writing and reading data) through a corresponding interface 210. With respect to this operation of the device controller 22, since a known method can be used, a detailed description will be omitted.

The first interface unit 14 of the control device 10 is, for example, a Peripheral Component Interconnect express (PCIe) interface, and is connected to the host-side device 1. Also, the second interface unit 15 includes a plurality of interface units 150a, 150b, . . . . The individual interface units 150a, 150b . . . , and 150n of the second interface unit 15 have FIFO (First-In First-Out) memories, respectively, and are connected to the interfaces 210a, 210b, . . . , and 210n of the storage device 2. Here, it is assumed that the interface units 150 and the interfaces 210 are connected such that each interface unit 150 is connected to an interface 210 having the same last reference symbol as that of the corresponding interface unit 150, for example, the interface unit 150a is connected to the interface 210a, and the interface unit 150b is connected to the interface 210b.

In the present embodiment, when a command is inputted from the AHCI controller 11 to an interface unit 150, the interface unit 150 outputs the command to an interface 210 of the storage device 2 connected to the interface unit 150. Also, when write object data is inputted from the AHCI controller 11 to an interface unit 150, the interface unit 150 stores the write object data in its FIFO memory. An interface 210 connected to the interface unit 150 reads the write object data from the FIFO memory, thereby acquiring the write object data.

When read object data is inputted from an interface 210 of the storage device 2 to an interface unit 150, the interface unit 150 stores the read object data in its FIFO memory. The AHCI controller 11 acquires the read object data from the FIFO memory.

As described above, the AHCI controller 11 of the control device 10 functionally includes the data processing unit 31, the bus master unit 32, and the virtual port units 33a, 33b, . . . . Further, the AHCI controller 11 performs data communication with the host-side device 1 by using a protocol capable of connecting one logical device to each virtual port (here, it is assumed that an AHCI protocol is used).

The AHCI controller 11 virtually sets as many ports which are defined by the AHCI protocol as the number of the interface units 150 of the second interface unit 15. In other words, the AHCI controller 11 emulates a state where a plurality of virtual ports corresponding to the interface units 150 of the second interface unit 15 is implemented in the form of hardware. As a result, the AHCI controller 11 operates as if it had virtual port units (hereinafter, referred to as the port units 33a, 33b, . . . , and 33n).

Therefore, the AHCI controller 11 emulates a state where each of the virtual port units 33a, 33b, . . . , and 33n is connected to corresponding one of the interfaces 210a, 210b, and 210n of the storage device 2 through the interface unit 150a, 150b, . . . , or 150n of the second interface unit 15.

Here, it is assumed that the virtual port units 33 and the interfaces 210 are connected such that each virtual port unit is connected to an interface having the same last reference symbol as that of the corresponding virtual port unit, for example, the virtual port unit 33a is connected to the interface 210a through the interface unit 150a, and the virtual port unit 33b is connected to the interface 210b through the interface unit 150b.

The data processing unit 31 assigns different logical unit numbers (LUNs) to the logical devices 24 connected to the data processing unit through the virtual port units 33a, 33b, . . . , and 33n, respectively, during an initialization period (such as when the power is first turned on). As a result, the host-side device 1 recognizes the virtual port units 33a, 33b, . . . of the AHCI controller 11 of the control device 10, as independent ports.

Also, the data processing unit 31 receives a data write instruction (a write command) and write object data from the host-side device 1 through the first interface unit 14.

In an example of the present embodiment, when the host-side device 1 issues a data write instruction, the host-side device 1 stores write instruction (a write command) and write object data in a memory of the host-side device 1 (hereinafter, referred to as the host memory for distinction).

Further, the host-side device 1 performs such setting that there is the write command, on a virtual port unit 33 corresponding to a device selected as a write destination. Specifically, the host-side device 1 sets a predetermined bit in a register of the virtual port unit 33, and writes in the register the information specifying those addresses on the host memory at which the write command and the write object data are stored.

When the setting that there is a write command on any virtual port unit 33 is established, the bus master unit 32 outputs the write command and the write object data read from the host memory to an interface unit 150 corresponding to the virtual port unit 33 through the setting-established virtual port unit 33, by using the information specifying the addresses on the host memory associated with the setting.

The write command includes the information specifying a logical sector of the logical device where the write object data is to be stored.

The data processing unit 31 receives a data read instruction (a read command) from the host-side device 1 through the first interface unit 14. Again, the host-side device 1 stores the read command in the host memory, and performs such setting that there is the read command on the virtual port unit 33 corresponding to the logical device storing a read object data. Specifically, the host-side device 1 sets a predetermined bit in a register of the virtual port unit 33.

When such setting that there is a read command on any virtual port unit 33 is established, the bus master unit 32 outputs the read command read from the host memory, to an interface unit 150 corresponding to the setting-established virtual port unit 33, through the virtual port unit 33, by using the information specifying the address on the host memory associated with the setting.

In the read command, information specifying a logical sector of a logical device storing the read object data is included.

In other words, the read command is outputted through an interface unit 150 connected to the virtual port unit 33 with such setting that there is the read command. Then, the data processing unit 31 receives data read from the logical device 24, through the interface unit 150 corresponding to the logical device 24, and outputs the data to the host-side device 1 by the AHCI protocol. In the above description, the AHCI controller 11 receives and transmits write object data or read data through the virtual port units 33. However, the bus master unit 32 of the AHCI controller 11 may directly perform communication of write object data or read data with the FIFO memory of an interface unit 150 corresponding to a virtual port unit 33 which is the output destination of a command.

As described above, the control device 10 of the present embodiment is connected to the host-side device 1 through the first interface unit 14 (a PCIe interface) which is one interface, by the AHCI protocol. Further, the control device 10 emulates a plurality of virtual ports. The emulated virtual ports are connected to the interfaces 210 of the storage device 2 through the FIFO memories of the interface units 150, respectively, and are also connected to different logical devices through the interfaces 210, respectively.

According to the present embodiment, if the storage device 2 is configured by dividing one storage disk device into a plurality of logical devices, among devices using the AHCI protocol, the host-side device 1 recognizes the storage device 2 as a plurality of physical devices connected to the host-side device 1, without using special driver software or the like.

[Operation]

Figure 4:
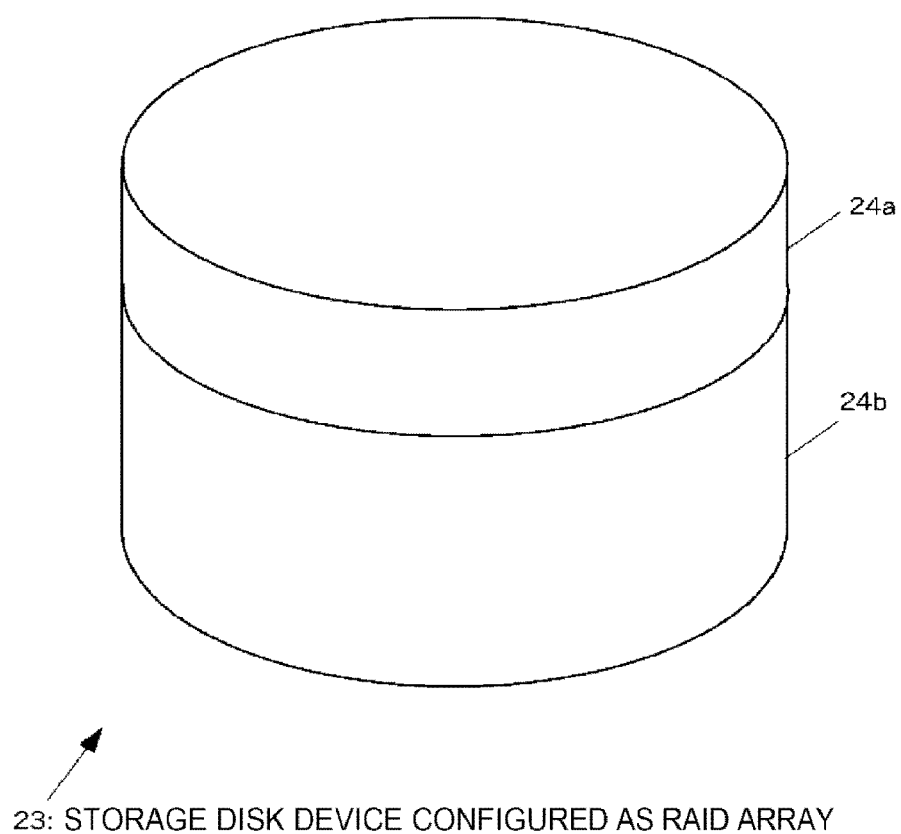
FIG. 4 is an explanatory view illustrating a configuration example of a logical device to be connected to the control device according to the embodiment of the disclosure.

The control device 10 of the present embodiment has the above-described configuration and operates as follows. In the following example, it is assumed that the storage disk devices 23 of the storage device 2 are configured as a RAID array and that the RAID array is divided into two logical device 24a and 24b as shown in FIG. 4. Also, it is assumed here that the logical device 24a has a disk size of 2 TiB or less.

In this example, the device controller 22 of the storage device 2 is connected to the interface unit 21 through a bus, and operates to connect the logical device 24a to the interface 210a and then to connect the logical device 24b to the interface 210b.

In an example of the present embodiment, the individual units of the control device 10, the interface unit 21 of the storage device 2, and the device controller 22 are mounted on the same substrate. The interface units 150a and 150b of the second interface unit 15 of the control device 10 are connected to the interfaces 210a and 210b of the storage device 2 by conductor wiring or the like, respectively.

The AHCI controller 11 of the control device 10 is a programmable device such as an FPGA, and performs the operations of the data processing unit 31 and the bus master unit 32. In the following description, the AHCI controller 11 emulates a state where it has a plurality of virtual ports implemented by hardware, specifically, a state where it has two virtual port units 33a and 33b corresponding to the interface units 150a and 150b.

The data processing unit 31 of the AHCI controller 11 assigns different LUNs to the logical devices 24a and 24b connected thereto through the virtual port units 33a and 33b, respectively, during an initialization period (such as when the power is first turned on).

Thereafter, when the host-side device 1 performs setting that there are a write command and write object data, on a virtual port unit 33, the AHCI controller 11 acquires the write command and the write object data from the host-side device 1 through the first interface unit 14. Then, the AHCI controller 11 outputs the write command through the virtual port unit 33 with the setting that there is the write command.

When the data processing unit 31 receives a read command which is a data read instruction, from the host-side device 1 through the first interface unit 14, the data processing unit 31 outputs the read command through the virtual port unit 33 with such setting that there is the read command.

In other words, in the present embodiment, the host-side device 1 performs data communication with the control device 10 by using the AHCI protocol. Also, as the control device 10 is involved, the host-side device 1 can recognize the logical devices 24a and 24b which are identified by two different LUNs, as different disks.

Here, even if an operating system which operates in the host-side device 1 is a system capable of being booted from a boot volume of 2 TiB or less (a volume which stores system data necessary for booting the operating system or the like), the operating system can be booted from the boot volume by storing the system data necessary for booting the operating system in the logical device 24a with its disk size not more than 2TiB, although the overall disk size of the RAID array exceeds 2TiB.

Also, at this time, if user data is stored in the logical device 24b different from the logical device 24a which stores the system data necessary for booting, the transfer of the operating system is possible without manipulating the user data, which improves convenience.

As described above, according to the control device 10 and the storage device 2 of the present embodiment, even though the storage device 2 is configured by dividing one storage disk device into a plurality of logical devices, the host-side device 1 recognizes, among devices using the AHCI protocol, the storage device 2 as a plurality of physical devices connected to the host-side device 1, without using special driver software or the like. Also, although the storage disk devices 23 of the storage device 2 are not limited to a RAID array, if they are configured as a RAID array, it is possible to improve the reliability (such as fault tolerance) of logical devices, as compared to a case where they are not configured as a RAID array.

[Modifications]

Figure 3:
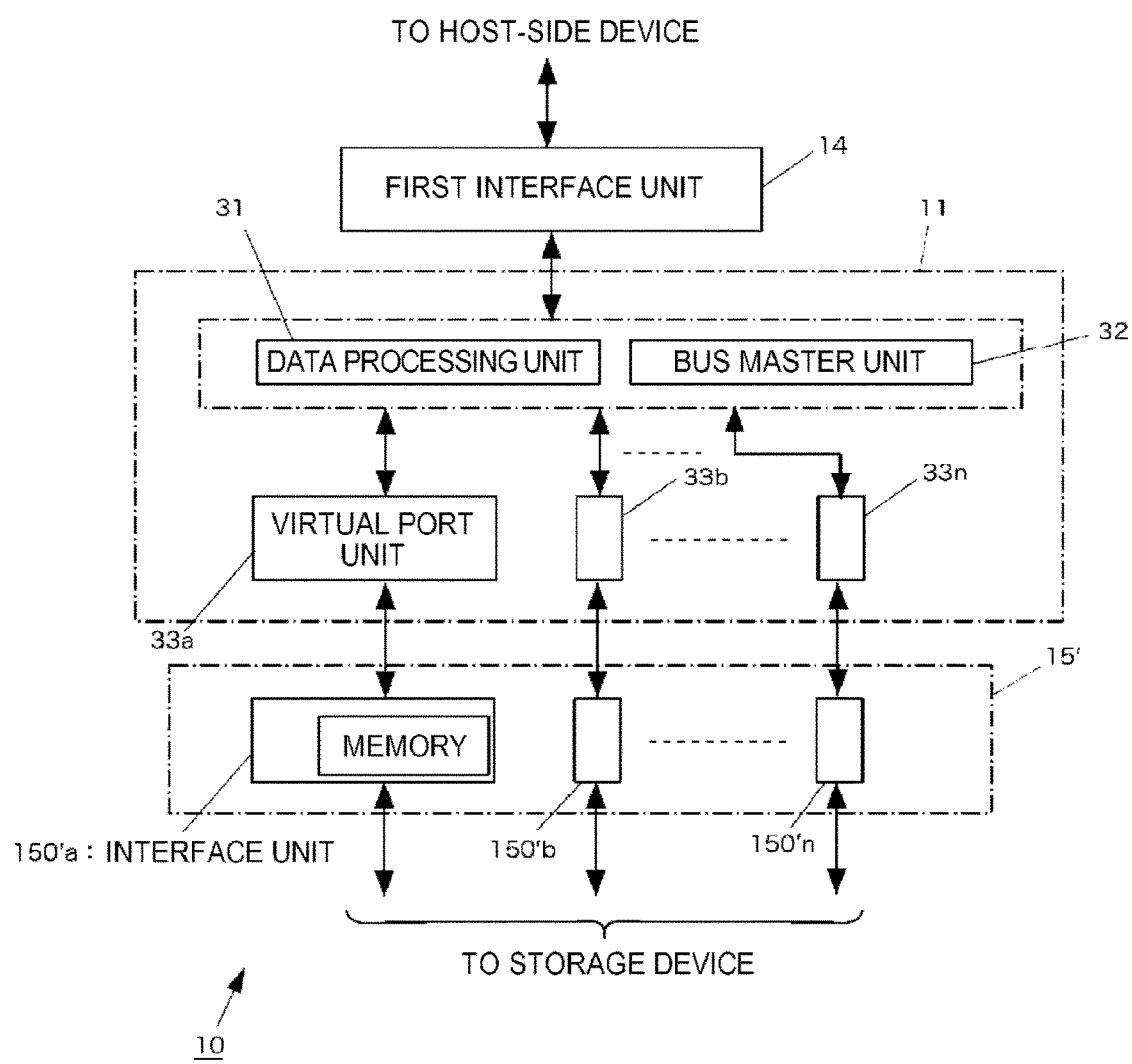
FIG. 3 is a block diagram illustrating another configuration example of the controller of the control device according to the embodiment of the disclosure.

In another example of the present embodiment as shown in FIG. 3, the control device 10 includes the AHCI controller 11, the first interface unit 14, and a second interface unit 15', and each interface 210 of the storage device 2 includes a memory and an FIFO memory (not shown in FIG. 1).

In this example, individual interface units 150' included in the second interface unit 15' have memories, respectively. Also, in this example, when such setting is established that there is a write command on any virtual port unit 33, the bus master unit 32 of the AHCI controller 11 outputs the write command and write object data read from the host memory to an interface unit 150' corresponding to the virtual port unit 33 with the setting, through the virtual port unit 33, by using information specifying an address on the host memory associated with the setting.

When the interface unit 150' receives the write command and the write object data from the bus master unit 32 through the virtual port unit 33 as described above, the interface unit 150' stores the write command and the write object data in its memory, and outputs them to an interface 210.

When the interface 210 connected to the interface unit 150' receives the write command and the write object data from the interface unit 150', the interface 210 stores the write command in its memory, and stores the write object data in FIFO memory.

The device controller 22 receives the write command and the write object data to be written in the storage disk devices 23, through the interface unit 21, and performs an operation of recording the write object data in the storage disk devices 23.

Similarly, when such setting that there is a read command on any virtual port unit 33 is established, the bus master unit 32 of the AHCI controller 11 outputs the read command read from the host memory, to an interface unit 150' corresponding to the virtual port unit 33 with the setting, through the virtual port unit 33, by using information specifying an address on the host memory associated with the setting.

Then, when the interface unit 150' receives the read command from the bus master unit 32, the interface unit 150' stores the read command in the memory of the interface unit 150', and outputs the read command to an interface 210.

When an interface 210 connected to the interface unit 150' receives the read command from the interface unit 150', the interface 210 stores the read command in its memory. The device controller 22 receives the read command through the interface unit 21, and reads data from the storage disk devices 23. Then, the device controller 22 outputs the read data to the interface unit 21.

When an interface 210 of the interface unit 21 receives the read data, the interface 210 stores the received data in its FIFO memory, and outputs the received data to an interface unit 150' connected thereto. In this case, the interface unit 150' outputs the data to the AHCI controller 11. When the bus master unit 32 of the AHCI controller 11 receives the data read from a logical device 24 designated as the output destination of the read command, the bus master unit 32 outputs the received data to the host-side device 1 by using the AHCI protocol.

In this example, the way the transmission and reception of data and commands between the interface units 150' and the interfaces 210 are performed is not particularly limited. As an example, the interface units 150' may emulate the operation of a SATA host controller, and the interfaces 210 may emulate the operation of a SATA device controller. In this case, when an interface 210 receives a command and write object data which is data addressed to a SATA device controller, from the control device 10, the interface 210 may output them as output data of the SATA device controller to the device controller 22. In this case, the interface 210 receives data outputted from the device controller 22, as data addressed to the SATA device controller which the interface 210 emulates, and outputs the received data to the control device 10.

In the present embodiment, the interface units 150' and the interfaces 210 do not necessarily need to emulate the functions of a SATA host controller and a SATA device controller, respectively, but may perform transmission and reception of commands and data by more simplified processing.

As in this example, in the case where the interface units 150' and the interfaces 210 do not emulate the functions of a SATA host controller and a SATA device controller, commands and data are not subjected to SATA protocol conversion, and therefore, the efficiency of transmission and reception of commands and data improves as compared to the case where commands and data are subjected to SATA protocol conversion.

Further, as the interface units 150 use the FIFO memories as in the example of FIG. 2, protocol conversion is not performed in transmission and reception of commands and data, and the process of storing them in a memory is more simplified than that in the example of FIG. 3, so that the efficiency of transmission and reception of data further improves.

According to the control device 10 and the storage device 2 of the present embodiment, even if the storage device 2 is configured by dividing one storage disk device into a plurality of logical devices, the host-side device 1 recognizes, among devices using the AHCI protocol, the storage device 2 as a plurality of physical devices connected to the host-side device 1, without using special driver software or the like. Also, the storage disk devices 23 of the storage device 2 are not limited to a RAID array. The adoption of an RAID array as the storage device 2 allows the logical devices to enjoy higher reliability (such as fault tolerance) than where the RAID array is not employed.

As described above, according to the embodiment of the disclosure, there is provided a control device which is configured to be connected to a host and a disk device including at least one RAID set and includes means connected to the host through one interface and performing data communication with the host by a protocol capable of connecting one logical device to each port, mean for virtually setting a plurality of ports which are defined by the protocol, means for setting a plurality of logical devices in the RAID set included in the disk device, and means for connecting the plurality of logical devices to the plurality of virtually set ports, respectively.

According to this configuration, the host can emulate a state where the plurality of logical devices is physically connected and can flexibly set the device configuration.

Here, the protocol may be an AHCI protocol. Further, the means for setting the plurality of logical devices in the RAID set may set at least a logical device which is an area for storing system data and a logical device which is an area for storing user data. Also, the means for setting the plurality of logical devices in the RAID set may perform setting such that at least one logical device has a capacity of 2 TiB or less.

According to this configuration, it is possible to flexibly set a device configuration.

The invention claimed is:

1. A control device configured to be connected to a host and a disk device, the disk device including a plurality of disk drives, the control device comprising:
   circuitry configured to
      virtually set a plurality of ports which are defined by a protocol;
      divide a Redundant Arrays of Independent Disks (RAID) set configured by the plurality of disk drives into a plurality of logical devices;
      set a plurality of logical devices in the RAID set included in the disk device;
      perform data communication with the host by the protocol for connecting one logical device in the RAID set to each port; and
      connect the plurality of logical devices to the plurality of ports, respectively, wherein
   the circuitry is configured to be connected to the host through an interface.

2. The control device according to claim 1, wherein the circuitry is configured to logically connect the plurality of logical devices to the plurality of ports, respectively.

3. The control device according to claim 1, wherein the protocol is an advanced host controller interface (AHCI) protocol.

4. The control device according to claim 1, wherein the circuitry is configured to set at least a logical device corresponding to an area for storing system data and a logical device corresponding to an area for storing user data.

5. The control device according to claim 1, wherein the circuitry is configured to set the plurality of logical devices in the RAID set such that at least one logical device has a capacity recognized as a boot volume or less, the boot volume being a volume necessary for booting an operating system of the host.

6. The control device according to claim 5, wherein the volume is 2TiB.

7. The control device according to claim 1, wherein the circuitry is configured to assign different logical unit numbers (LUNs) to the logical devices connected through the plurality of virtually set ports, respectively.

8. The control device according to claim 7, wherein the circuitry is configured to assign the LUNs to the logical devices during an initialization period of the control device.

9. The control device according to claim 8, wherein the initialization period is a period during which a power of the control device is turned on.

10. The control device according to claim 1, further comprising:
   a plurality of interface units,
   wherein the circuitry is configured to connect the plurality of logical devices to the plurality of virtually set ports through the plurality of interface units, respectively.

11. The control device according to claim 10, wherein at least one of the plurality of interface units includes a First-In First-Out (FIFO) memory.

12. The control device according to claim 10, wherein the circuitry is configured to virtually set the plurality of ports by emulating a state where a plurality of ports corresponding to the plurality of interface units is implemented.

13. The control device according to claim 10, wherein at least one of the plurality of interface units includes a memory for storing a write command and a write object data.

14. The control device according to claim 1, wherein the circuitry is configured to set the plurality of logical devices based on an input setting value.

15. The control device according to claim 14, wherein the input setting value represents a number of the plurality of logical devices.

16. The control device according to claim 1, wherein the circuitry is configured to send a setting value for setting the plurality of logical devices when a register value for setting logical devices in the circuitry is rewritten according to an instruction from the host.

17. A storage system, comprising:
   a storage device; and
   a control device,
   wherein the storage device includes
      a disk device including a plurality of disk drives;
      device controller circuitry configured to control the disk device; and
      a plurality of interfaces configured to be connected to the control device, and
   wherein the control device includes
      one interface configured to be connected to a host;
      a plurality of interface units configured to be connected to the plurality of interfaces of the storage device, respectively; and
      circuitry configured to
         virtually set a plurality of ports which are defined by a protocol;
         divide a Redundant Arrays of Independent Disks (RAID) set configured by the plurality of disk drives into a plurality of logical devices;
         set a plurality of logical devices in the RAID set included in the disk device;
         perform data communication with the host by the protocol for connecting one logical device in the RAID set to each port; and
         connect the plurality of logical devices to the plurality of ports through the plurality of interface units and the plurality of interfaces, respectively,
   wherein the circuitry is configured to be connected to the host through the one interface.

18. The storage system according to claim 17, wherein the protocol is an advanced host controller interface (AHCI) protocol.

19. The storage system according to claim 17, wherein the circuitry sets at least a logical device corresponding to an area for storing system data and a logical device corresponding to an area for storing user data.

20. The storage system according to claim 17, wherein the circuitry is configured to set the plurality of logical devices in the RAID set such that at least one logical device has a capacity recognized as a boot volume or less, the boot volume being a volume necessary for booting an operating system of the host.

* * * * *